(12) United States Patent
Ichikawa et al.

(10) Patent No.: US 8,155,766 B2
(45) Date of Patent: Apr. 10, 2012

(54) METHODS AND APPARATUS TO PROVISION POWER-SAVING STORAGE SYSTEM

(75) Inventors: Naoko Ichikawa, San Jose, CA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 638 days.

(21) Appl. No.: 12/263,518

(22) Filed: Nov. 3, 2008

(65) Prior Publication Data

US 2010/0115305 A1    May 6, 2010

(51) Int. Cl.
- *G05B 9/02* (2006.01)
- *G06F 1/00* (2006.01)
- *G06F 11/00* (2006.01)
- *G06F 13/00* (2006.01)

(52) U.S. Cl. .......... 700/82; 711/162; 713/320; 713/322; 714/23; 714/24

(58) Field of Classification Search .................. 700/295, 700/297, 82; 713/320, 322; 711/162, 170; 714/23, 24

See application file for complete search history.

(56) References Cited

U.S. PATENT DOCUMENTS

| | | | | |
|---|---|---|---|---|
| 5,021,938 A | * | 6/1991 | Hayakawa | 700/3 |
| 5,511,204 A | * | 4/1996 | Crump et al. | 713/321 |
| 5,828,823 A | * | 10/1998 | Byers et al. | 714/24 |
| 5,978,921 A | * | 11/1999 | Ryu | 713/300 |
| 6,865,640 B2 | * | 3/2005 | Dimitri et al. | 711/100 |
| 7,038,984 B2 | * | 5/2006 | Hayashi | 714/14 |
| 7,340,616 B2 | * | 3/2008 | Rothman et al. | 713/300 |
| 7,346,790 B1 | * | 3/2008 | Klein | 713/320 |
| 7,472,300 B1 | * | 12/2008 | Haustein et al. | 713/323 |
| 7,478,251 B1 | * | 1/2009 | Diab et al. | 713/300 |
| 7,512,643 B2 | * | 3/2009 | Kobayashi et al. | 1/1 |
| 7,548,502 B2 | * | 6/2009 | Hayashi | 714/14 |
| RE40,866 E | * | 8/2009 | Fung | 713/300 |
| 7,596,476 B2 | * | 9/2009 | Rasmussen et al. | 703/2 |
| 7,640,443 B2 | * | 12/2009 | Fujimoto | 713/300 |
| 7,669,008 B2 | * | 2/2010 | Kubo et al. | 711/162 |
| 7,694,072 B2 | * | 4/2010 | Nehse | 711/171 |
| 7,698,503 B2 | * | 4/2010 | Okada et al. | 711/162 |

(Continued)

OTHER PUBLICATIONS

Infortrend Technology, Inc., "Technical Brief: Increasing the Efficiency of Your RAID Storage to Make it Greener", Jul. 2008, Infortrend Technology, Inc., www.infortrend.com.*

(Continued)

*Primary Examiner* — Kakali Chaki
*Assistant Examiner* — Kelvin Booker
(74) *Attorney, Agent, or Firm* — Mattingly & Malur, P.C.

(57) ABSTRACT

A power-saving computer system comprises a plurality of storage areas provided by one or more storage systems, including at least one first storage area which is always powered on and at least one second storage area which is periodically powered on and off according to a power control schedule. The at least one first storage area provides primary and secondary volumes of a first backup set that is scheduled as always paired. For a second backup set that is scheduled as normally suspended and resynchronized according to a backup schedule, a primary volume of the second backup set is included in the at least one first storage area and a secondary volume of the second backup set is included in the at least one second storage area. The at least one second storage area is powered on during every backup time for resynchronizing the second backup set according to the backup schedule.

18 Claims, 21 Drawing Sheets

U.S. PATENT DOCUMENTS

| | | | | |
|---|---|---|---|---|
| 7,698,517 | B2* | 4/2010 | Tulyani | 711/162 |
| 7,725,650 | B2* | 5/2010 | Umemura et al. | 711/170 |
| 7,739,388 | B2* | 6/2010 | Wood | 713/322 |
| 7,814,351 | B2* | 10/2010 | Lubbers et al. | 713/300 |
| 7,814,361 | B2* | 10/2010 | Higham et al. | 713/400 |
| 7,849,263 | B1* | 12/2010 | French | 711/170 |
| 7,870,241 | B2* | 1/2011 | Biran et al. | 709/223 |
| 7,870,409 | B2* | 1/2011 | Murase | 713/324 |
| 7,882,373 | B1* | 2/2011 | More et al. | 713/300 |
| 7,886,036 | B2* | 2/2011 | Ardagna et al. | 713/1 |
| 7,953,909 | B2* | 5/2011 | Zimoto et al. | 713/300 |
| 8,001,343 | B2* | 8/2011 | Kassai | 711/162 |
| 8,001,393 | B2* | 8/2011 | Hori et al. | 713/300 |
| 8,001,419 | B2* | 8/2011 | Killian et al. | 714/14 |
| 8,024,587 | B2* | 9/2011 | Fujimoto | 713/300 |
| 8,037,322 | B2* | 10/2011 | Yamanaka et al. | 713/300 |
| 8,037,332 | B2* | 10/2011 | Haustein et al. | 713/320 |
| 8,051,156 | B1* | 11/2011 | Sharma et al. | 700/276 |
| 8,060,767 | B1* | 11/2011 | Wright | 713/323 |
| 8,069,354 | B2* | 11/2011 | Min | 713/300 |
| 2002/0156971 | A1* | 10/2002 | Jones et al. | 711/114 |
| 2006/0259795 | A1* | 11/2006 | Tsai et al. | 713/300 |
| 2007/0038414 | A1* | 2/2007 | Rasmussen et al. | 700/291 |
| 2007/0078635 | A1* | 4/2007 | Rasmussen et al. | 703/1 |
| 2007/0079087 | A1* | 4/2007 | Wang et al. | 711/161 |
| 2007/0079156 | A1 | 4/2007 | Fujimoto | |
| 2007/0174024 | A1* | 7/2007 | Rasmussen et al. | 703/1 |
| 2007/0266205 | A1* | 11/2007 | Bevilacqua et al. | 711/114 |
| 2008/0120462 | A1* | 5/2008 | Nehse | 711/173 |
| 2008/0256397 | A1* | 10/2008 | Smith | 714/47 |
| 2008/0270696 | A1* | 10/2008 | Murayama et al. | 713/320 |
| 2008/0301479 | A1* | 12/2008 | Wood | 713/322 |
| 2009/0006744 | A1* | 1/2009 | Cavallo et al. | 711/114 |
| 2009/0138313 | A1* | 5/2009 | Morgan et al. | 705/8 |
| 2009/0177837 | A1* | 7/2009 | Kaneda | 713/323 |
| 2009/0254645 | A1* | 10/2009 | Haustein et al. | 709/223 |
| 2009/0271645 | A1* | 10/2009 | Mori | 713/320 |
| 2009/0287851 | A1* | 11/2009 | Ejiri et al. | 710/14 |
| 2009/0292889 | A1* | 11/2009 | Durfee | 711/162 |
| 2009/0307284 | A1* | 12/2009 | Welingkar et al. | 707/204 |
| 2009/0313427 | A1* | 12/2009 | Ukai et al. | 711/114 |
| 2010/0049916 | A1* | 2/2010 | Nakajima et al. | 713/320 |
| 2010/0083260 | A1* | 4/2010 | Wang et al. | 713/323 |
| 2011/0072291 | A1* | 3/2011 | Murase | 713/324 |
| 2011/0197088 | A1* | 8/2011 | Kumar et al. | 714/48 |
| 2011/0231683 | A1* | 9/2011 | Kumasawa et al. | 713/320 |
| 2011/0239013 | A1* | 9/2011 | Muller | 713/320 |

OTHER PUBLICATIONS

SNIA, "Common RAID Disk Data Format Specification: Revision 1.2", Jul. 28, 2006, Storage Networking Industry Association, SNIA Technical Position, www.snia.org.*

Fujitsu, "MAID for Green: Energy Conservation with Fujitsu ETERNUS Storage Systems—Version 1.1", Nov. 2007, obtained from the Internet [www.Fujitsu.com] on Nov. 29, 2011.*

Clark, T., "Brocade-Strategies for Data Protection, First Edition—A Strategic Approach to Comprehensive Data Protection", Jun. 2008.*

* cited by examiner (a) Power Control Schedule Table 632

| Storage Subsystem ID | Power control |
|---|---|
| 10000 | Disabled |
| 20000 | Enabled |
| 30000 | Enabled |

6320　　　6321

(b) Power Control Schedule Table 632

| Storage Subsystem ID | Power control frequency | Power-on time | Power-off time |
|---|---|---|---|
| 20000 | Daily | 0:00 | 4:00 |
| 30000 | Daily | 2:00 | 5:00 |

Backup Schedule Table 635

| Pair ID | Backup Frequency | Backup start time | Backup due time |
|---|---|---|---|
| 0 | Daily | 0:00 | 4:00 |
| 1 | Daily | 2:00 | 5:00 |
| 2 | Daily | 2:00 | 5:00 |

Pair Configuration Table 153

| Pair ID | Storage Subsystem ID of Primary Volume | Primary Volume ID | Capacity | Storage Subsystem ID of Secondary Volume | Secondary Volume ID | Capacity |
|---|---|---|---|---|---|---|
| 0 | 10000 | 0 | 100GB | H100-0000 | 10 | 100GB |
| 1 | 10000 | 1 | 100GB | H100-0000 | 11 | 100GB |
| 2 | 10000 | 2 | 100GB | M100-0000 | 12 | 100GB |

Volume List Table 156

| Volume ID | Disk Controller ID | Parity Group ID | Capacity |
|---|---|---|---|
| 0 | 01 | 1A | 100GB |
| 1 | 01 | 0C | 100GB |
| 2 | 02 | B5 | 200GB |
| 3 | 02 | 01 | 200GB |
| 4 | 02 | F1 | 200GB |
| | ⋮ | ⋮ | ⋮ |

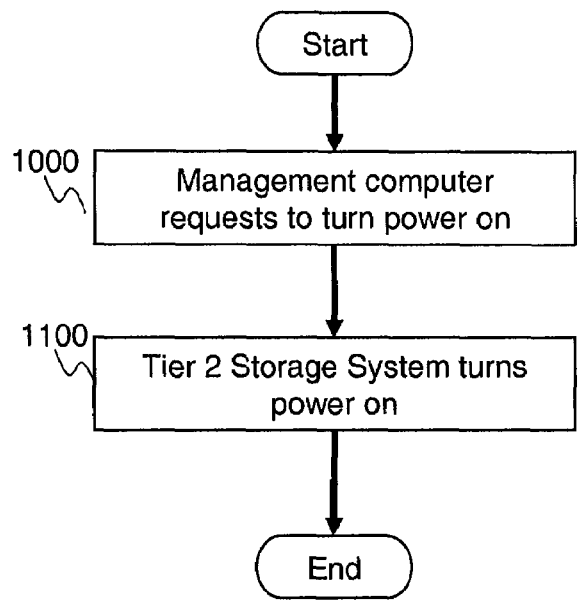
Fig. 12(a) Power Control Operation flow
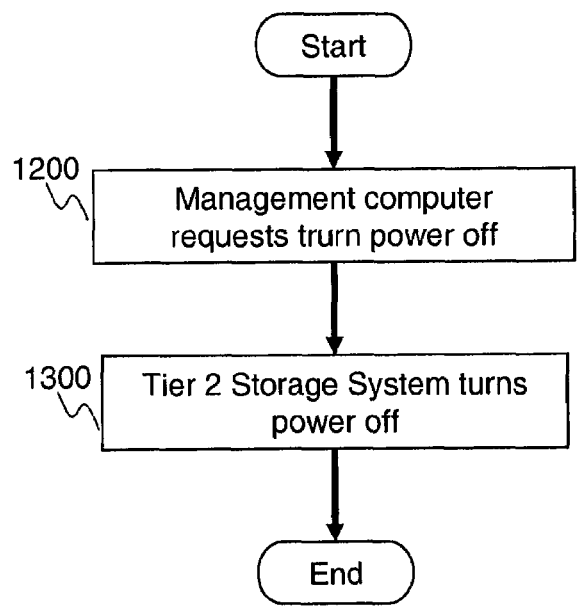
Fig. 12 (b) Power Control Operation flow

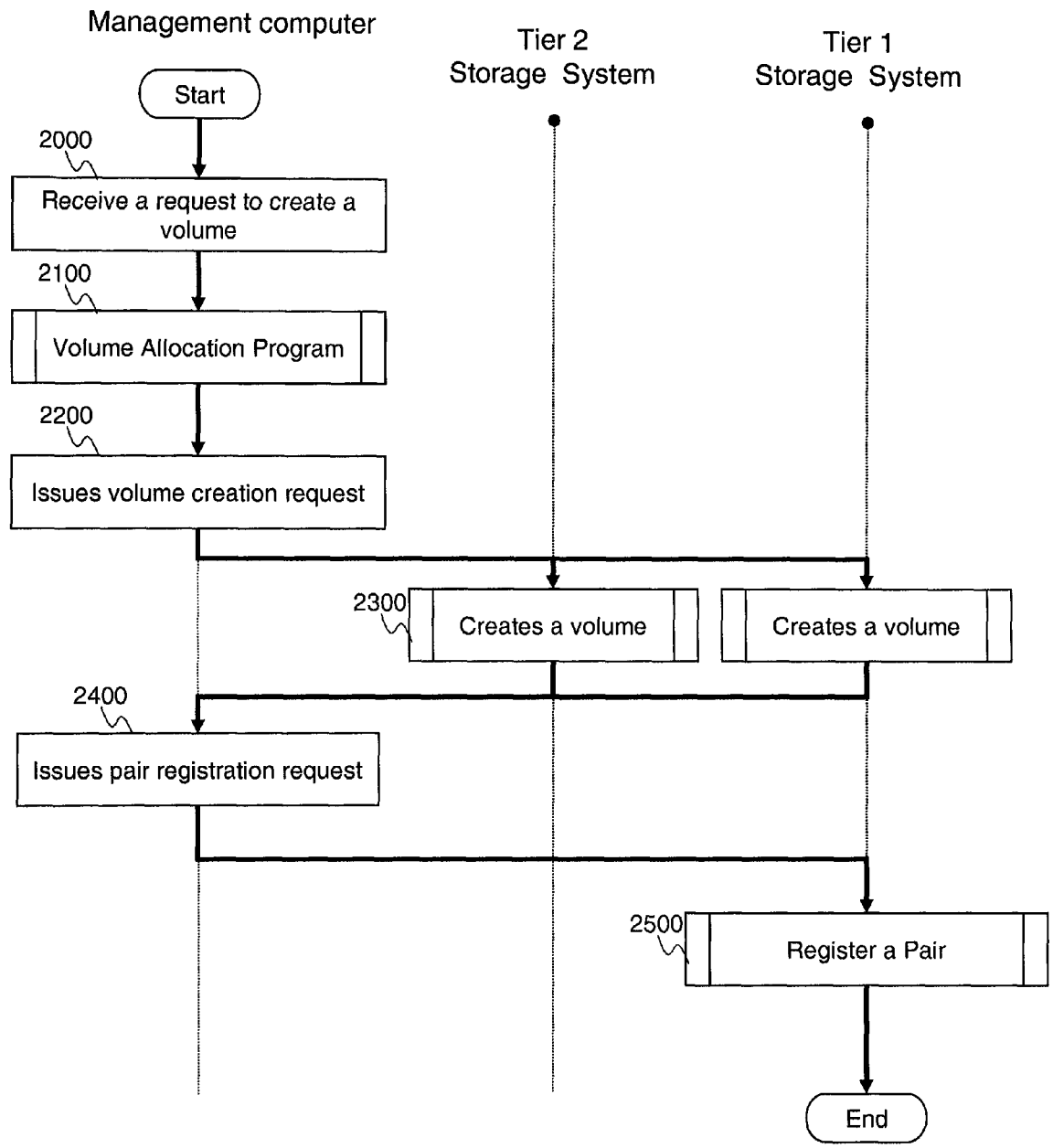
Fig. 13 Overall process for provisioning

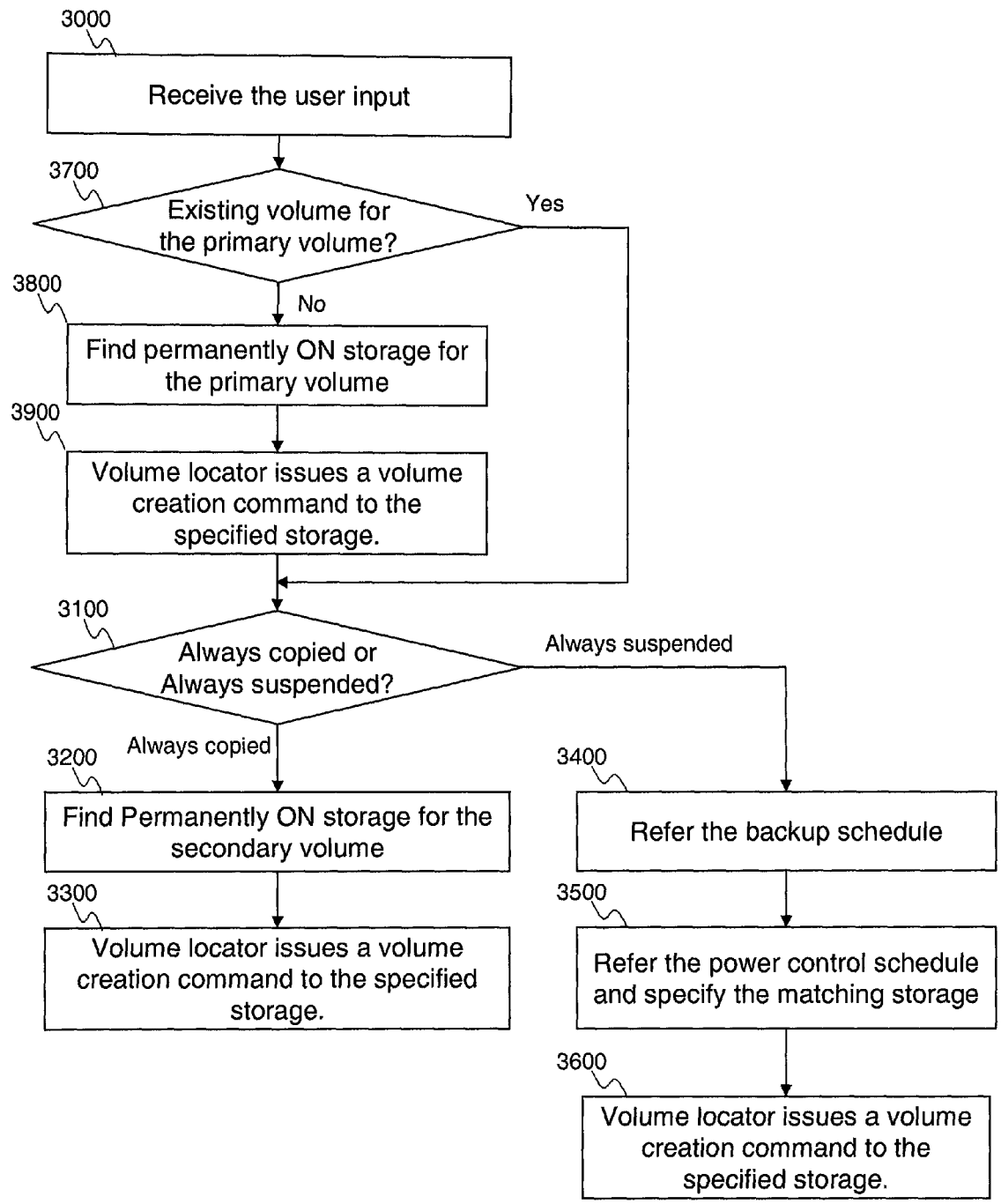
Fig. 14 Storage Determination – Volume allocation program 631

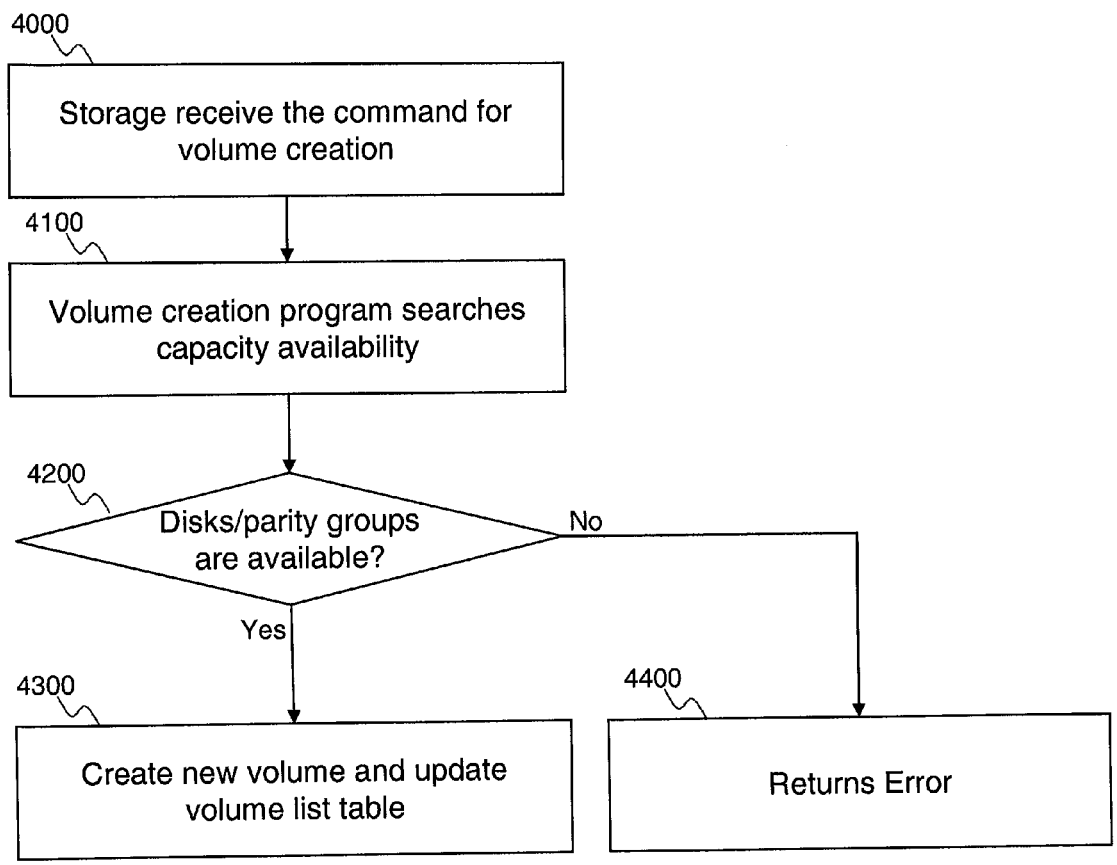
Fig. 15 Volume creation process

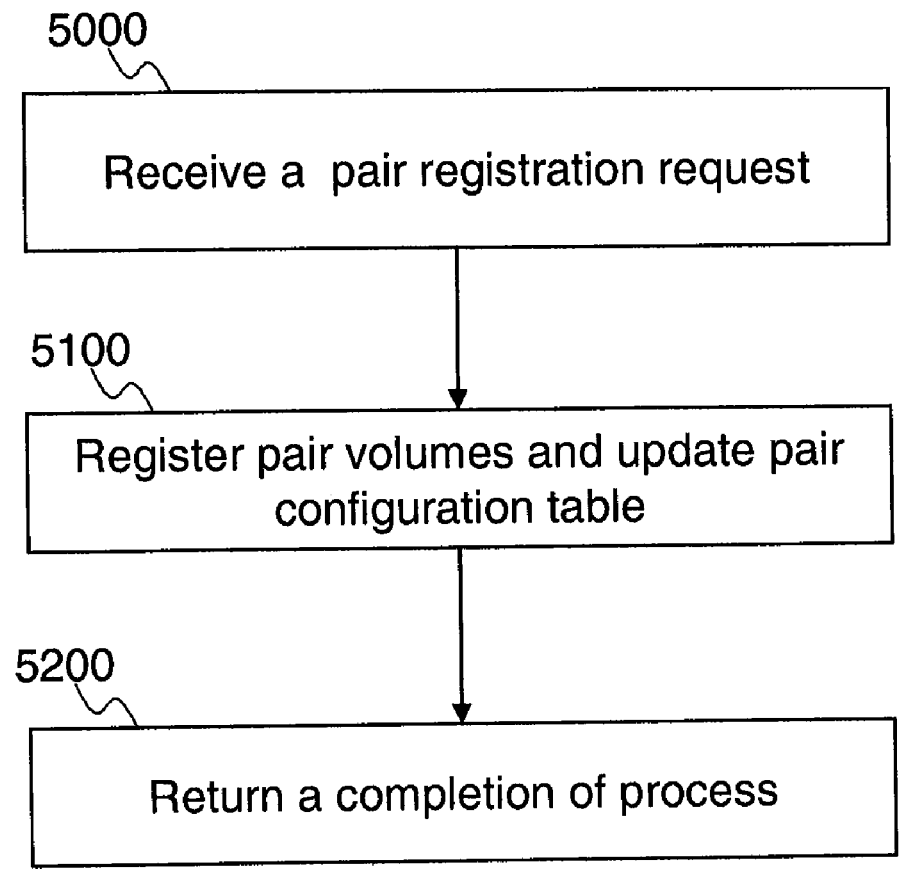
Fig. 16 Pair Registration process

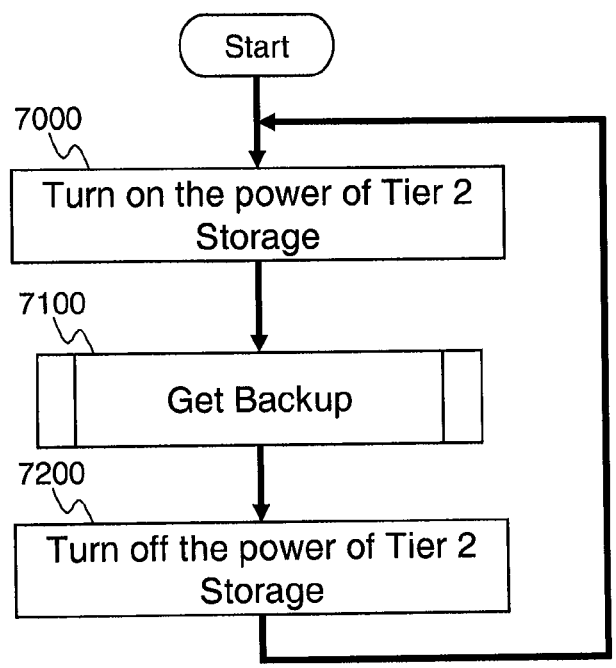
Fig. 17 Power Control and Backup Operation flow

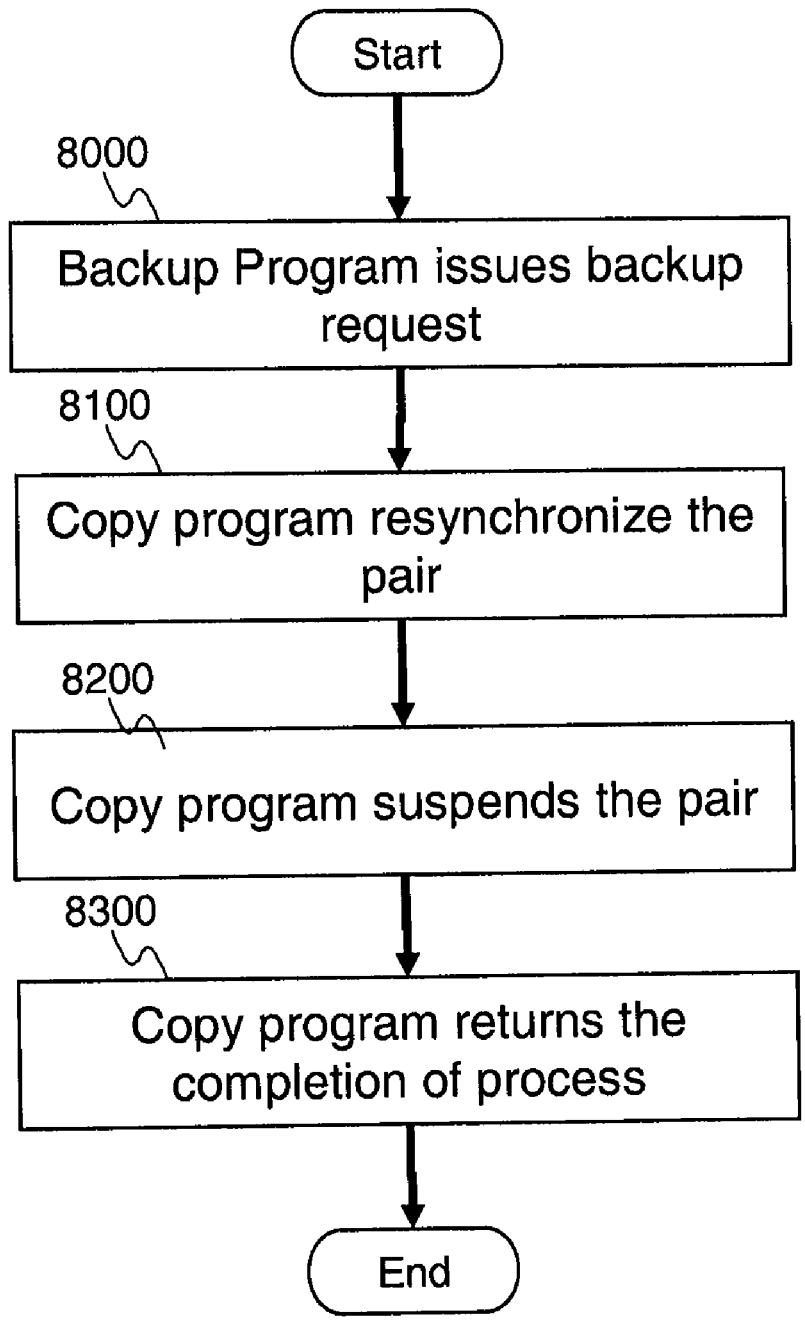
Fig. 18 Backup Operation flow

Power Control Schedule Table 632

| Storage Subsystem ID | Disk Controller ID | Parity Group ID | Power control frequency | Power-on time | Power-off time |
|---|---|---|---|---|---|
| 20000 | 01 | 1A | Daily | 0:00 | 4:00 |
| 20000 | 01 | 0C | Daily | 2:00 | 5:00 |
| 20000 | 02 | B5 | Daily | 2:00 | 5:00 |
| 6390 | 6391 | 6392 | 6393 | 6394 | 6395 |

Fig. 20

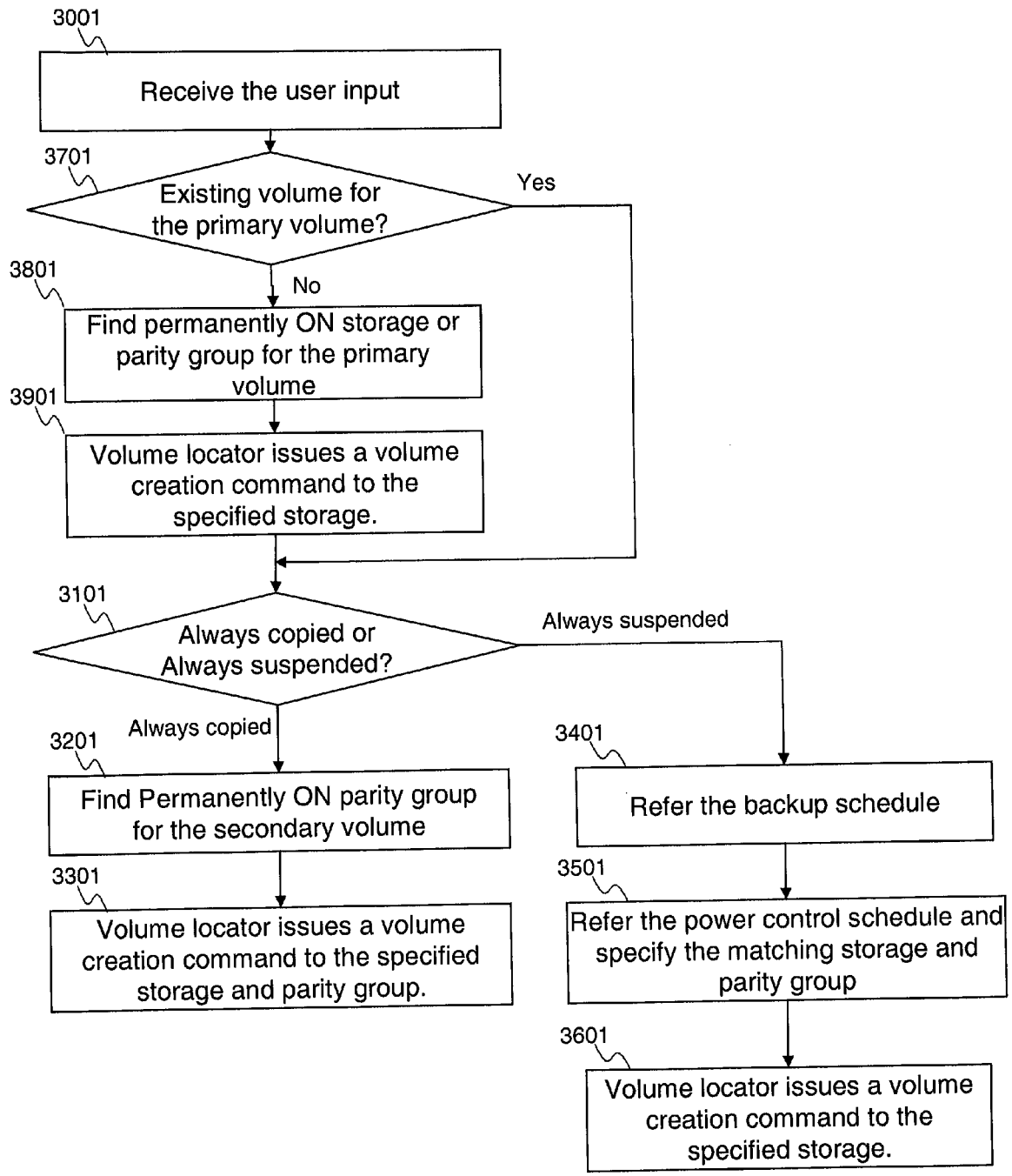
Fig. 21 Storage Determination – Volume allocation program 631

METHODS AND APPARATUS TO PROVISION POWER-SAVING STORAGE SYSTEM

BACKGROUND OF THE INVENTION

The present invention relates generally to power-saving in storage systems and, more particularly, to methods and apparatus to provision a data storage configuration with consideration of the power control schedule of storage subsystems.

Recently power consumption efficiency in information systems is gaining attention as an important issue and many enterprise organizations are committed to improving their information systems to conserve energy. Under current solutions, users can save electric power consumption by switching on and off the power supply of the entire storage apparatus or a part of the storage apparatus in their operation. For example, U.S. Patent Application Publication No. 20070079156 provides a method to control the power supply on a hard disk group basis, and to determine the time to turn on or off the hard disks based on collected system running information. Applying current solutions, it is possible to reduce power consumption by supplying electric power only when it is necessary and stopping it when it is unnecessary. For instance, users can turn on the power of the storage device that stores backup data only during the time when the backup process is running, and turn off the power after backup is done because the backup data storage is normally accessed only during a backup process except restoration.

The application of current solutions, however, gives rise to a situation in which a single information system includes both storage apparatus that are always turned on and storage apparatus that are regularly turned off. This mixture of different data storage apparatus makes it difficult for users to provision a new backup configuration. If they do not locate a backup data volume properly, the new backup set cannot take advantage of the power-saving storage system. For example, if they locate a backup volume in permanently power-on storage, the backup volume keeps consuming electric power even though it is not necessary until the backup process starts. On the other hand, if they locate a backup volume in a regularly turned-off storage, they need to be sure the scheduled backup time is within the available time of the power-saving storage.

BRIEF SUMMARY OF THE INVENTION

Embodiments of the invention provide methods and apparatus to provision appropriate configuration of data volumes in power-saving information systems. In a power-saving storage system that is periodically turned off, new backup set volumes need to be located properly with consideration of power control schedule so that they can consistently or continuously leverage the power-saving effect. The storage system includes a function that coordinates and provisions a backup configuration based on both the backup requirements and power control schedule of the storage system. If the backup set is scheduled as always running copy (paired), the primary volume and secondary volume of the backup set is located on the permanently power-on storage; and if the backup set is scheduled as normally suspended and resynchronized with regular intervals, the secondary volume is located on the power-saving storage that is operated with the power control schedule and is available during the backup (resynchronization) process. In this way, it becomes possible to provision appropriate location of backup volumes that can leverage both the existing power-saving feature and the required backup plan or schedule.

In accordance with an aspect of the present invention, a power-saving computer system comprises a plurality of storage areas provided by one or more storage systems, including at least one first storage area which is always powered on and at least one second storage area which is periodically powered on and off according to a power control schedule. The at least one first storage area provides primary and secondary volumes of a first backup set that is scheduled as always paired. For a second backup set that is scheduled as normally suspended and resynchronized according to a backup schedule, a primary volume of the second backup set is included in the at least one first storage area and a secondary volume of the second backup set is included in the at least one second storage area. The at least one second storage area having the secondary volume of the second backup set is powered on according to the power control schedule during every backup time for resynchronizing the second backup set according to the backup schedule.

In some embodiments, the at least one second storage area each includes one or more storage disks, the system further comprising: a power controller that switches power on or off for the one or more storage disks of each of the at least one second storage area according to the power control schedule. The at least one first storage area is provided in a first storage system and is always powered on. The at least one second storage area is provided in a second storage system and is periodically powered on or off according to the power control schedule. The second storage system includes a power controller that switches power on or off for the at least one second storage area provided therein according to the power control schedule. The second storage system includes a plurality of power controllers each corresponding to one of a plurality of the second storage areas each having at least one storage disk, and each power controller switches power on or off for the corresponding second storage area according to the power control schedule. A power controller switches power on or off for the at least one second storage area according to the power control schedule.

In specific embodiments, a management computer maintains the backup schedule and the power control schedule, and manages powering on or off of the at least one second storage area. The management computer allocates the secondary volume of the second backup set according to the backup schedule and the power control schedule. The management computer changes the power control schedule based on the backup schedule, if necessary, so that the at least one second storage area having the secondary volume of the second backup set is powered on during every backup time for resynchronizing the second backup set according to the backup schedule. For a third backup set that is scheduled as normally suspended and resynchronized according to the backup schedule, a primary volume of the third backup set is included in the at least one first storage area and a secondary volume of the third backup set is also included in the at least one first storage area, if a backup time of the secondary volume of the third backup set does not match a time when the at least one second storage area is powered on according to the power control schedule.

Another aspect of the invention is directed to a method to provide data storage for power-saving in a computer system which includes a plurality of storage areas provided by one or more storage systems, including at least one first storage area which is always powered on and at least one second storage area which is periodically powered on and off according to a power control schedule. The method comprises allocating to the at least one first storage area primary and secondary volumes of a first backup set that is scheduled as always paired; and for a second backup set that is scheduled as normally suspended and resynchronized according to a backup schedule, allocating a primary volume of the second backup set to the at least one first storage area and allocating a secondary volume of the second backup set to the at least one second storage area. The at least one second storage area having the secondary volume of the second backup set is powered on according to the power control schedule during every backup time for resynchronizing the second backup set according to the backup schedule.

Another aspect of the invention is directed to a computer-readable medium storing a plurality of instructions for controlling a data processor to provide data storage for power-saving in a computer system which includes a plurality of storage areas provided by one or more storage systems, including at least one first storage area which is always powered on and at least one second storage area which is periodically powered on and off according to a power control schedule. The computer-readable medium storing the plurality of instructions comprises instructions that cause the data processor to allocate to the at least one first storage area primary and secondary volumes of a first backup set that is scheduled as always paired; and instructions that cause the data processor, for a second backup set that is scheduled as normally suspended and resynchronized according to a backup schedule, to allocate a primary volume of the second backup set to the at least one first storage area and to allocate a secondary volume of the second backup set to the at least one second storage area;

wherein the at least one second storage area having the secondary volume of the second backup set is powered on according to the power control schedule during every backup time for resynchronizing the second backup set according to the backup schedule.

These and other features and advantages of the present invention will become apparent to those of ordinary skill in the art in view of the following detailed description of the specific embodiments.

BRIEF DESCRIPTION OF THE DRAWINGS

FIG. 3 illustrates an example of a Power Control Schedule Table in the memory of the management computer of FIG. 2 according to a first embodiment of the invention.

FIG. 4 illustrates an example of a Backup Schedule Table in the memory of the management computer of FIG. 2.

FIG. 8 illustrates an example of a Pair Configuration Table in the memory of the Tier 1 storage system of FIG. 5.

FIG. 9 illustrates an example of a Volume List Table in the memory of the Tier 1 storage system of FIG. 5.

FIG. 12(a) illustrates an example of a process flow of operation to turn on the power supply of the Tier 2 storage system.

FIG. 12(b) illustrates an example of a process flow of operation to turn off the power supply of the Tier 2 storage system.

FIG. 13 illustrates an example of an overall process flow of the backup environment setup process.

FIG. 14 illustrates an example of a process flow of the Volume Allocation Program in the memory of the management computer of FIG. 2 according to the first embodiment of the invention.

FIG. 15 illustrates an example of the volume creation process executed by the Volume Management Program in the memory of the Tier 1 storage system of FIG. 5.

FIG. 16 illustrates an example of a process flow of pair registration executed by the Volume Management Program in the memory of the Tier 1 storage system of FIG. 5.

FIG. 17 illustrates an example of a process flow of the overall power control and backup operation of the power-saving storage system.

FIG. 18 illustrates an example of a process flow of the backup operation.

FIG. 20 illustrates an example of a Power Control Schedule Table in the memory of the management computer of FIG. 2 according to the second embodiment of the invention.

FIG. 21 illustrates an example of a process flow of the Volume Allocation Program in the memory of the management computer of FIG. 2 according to the second embodiment of the invention.

DETAILED DESCRIPTION OF THE INVENTION

Figure 1:
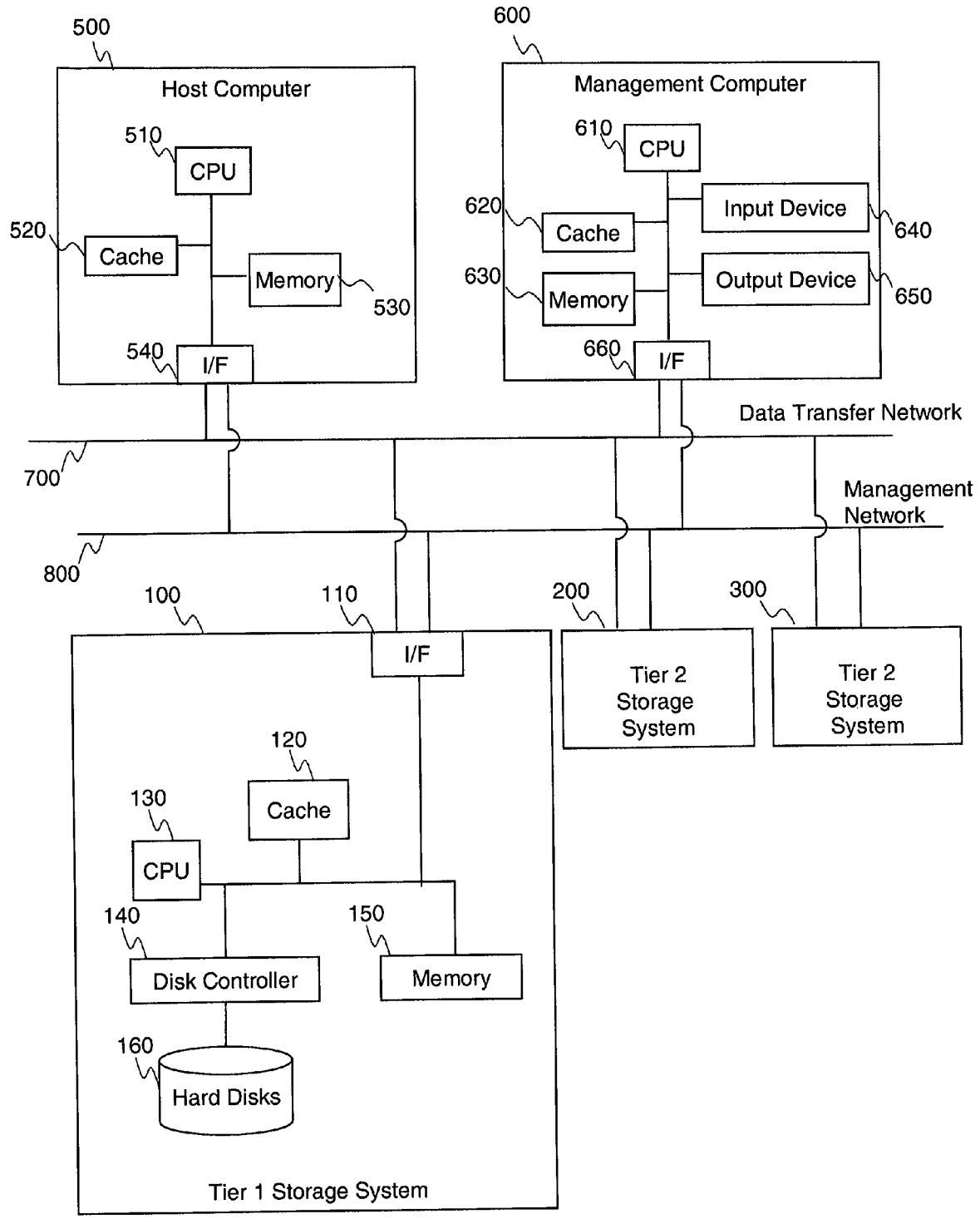
FIG. 1 illustrates the hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Exemplary embodiments of the invention, as will be described in greater detail below, provide apparatuses, methods and computer programs to provision a data storage configuration with consideration of the power control schedule of storage subsystems.

First Embodiment

In the first embodiment, a method to provision the primary volume and the secondary volume for the backup set is explained. It is assumed that the computer system has at least one Tier 1 storage system and at least one Tier 2 storage system and that the Tier 2 storage system is periodically turned on/off for the purpose of power-saving effect. By applying the invention in the first embodiment, it becomes possible to provision the appropriate location of backup volumes in a way that leverages both the existing power-saving feature and the required backup plan.

1. System Structure

FIG. 1 illustrates the hardware configuration of a system in which the method and apparatus of the invention may be applied. The computer system includes a host computer 500, a management computer 600, at least one Tier 1 storage system 100, and at least one Tier 2 storage system 200, 300 that are connected via a data transfer network 700 and a management network 800.

The host computer 500 includes a CPU 510 that controls the operation of the host computer 500, a cache 520 for storing data temporarily, a memory 530 for storing programs and tables read and used by the CPU 510 to manage the operation of the host computer 500, an interface 540 that transmits data to and receives data from the networks 700, 800. It includes an interface for the Ethernet network interface and an FC network interface.

The management computer 600 includes a CPU 610 that controls the operation of the management computer 600, a cache 620 for storing data temporarily, a memory 630 for storing programs and tables read and used by CPU 610 to manage the operation of the computer system, an input device 640 such as a keyboard, an output device 650 such as an LCD, and an interface 660 that transmits data to and receives data from the networks 700, 800. It includes an interface for the Ethernet network interface and an FC network interface.

The Tier 1 storage system 100 represents the primary storage system that holds data volumes storing Tier 1 data such as online transaction data that is frequently accessed. The Tier 1 storage system 100 includes an interface 110 providing an interface for the Ethernet network interface and an FC network interface, a cache 120 for storing data temporarily, a CPU 130 that calls the programs and tables stored in a memory 150 and executes the programs, and a disk controller 140 for controlling associated hard disks 160. The memory 150 stores programs and tables read by the CPU 130. There are one or more hard disks 160. A plurality of hard disks 160 can make a RAID configuration for redundancy. The group of hard disks for a single RAID configuration is called a "parity group" and an identification number is assigned to each parity group. These groups of hard disks are used as logically separate volumes such as primary volumes and secondary volumes of a copy pair. In the Tier 1 storage system 100, the hard disks 160 may include FC disks that enable high speed access to stored data.

The Tier 2 storage systems 200 and 300 represent storage systems for storing Tier 2 data such as backup data that are less critical than the data stored in the Tier 1 storage system 100. The detailed internal structure of the Tier 2 storage systems 200, 300 is described below.

The data transfer network 700 is used to transfer user data. For example, transaction data created by users on a host computer are transferred via the data transfer network 700 to the Tier 1 storage system 100 in order to store them. The data transfer network 700 can be either LAN or SAN, for instance.

The management network 800 is used to transfer management information regarding the computer system. The host computer 500, the management computer 600, the Tier 1 storage system 100, and the Tier 2 storage systems 200, 300 transmit and receive the management information mutually via the management network 800. This network can be either LAN or SAN, for instance. It is also possible that the data transfer network 700 and the management network 800 are part of the same network in actual configuration.

Figure 2:
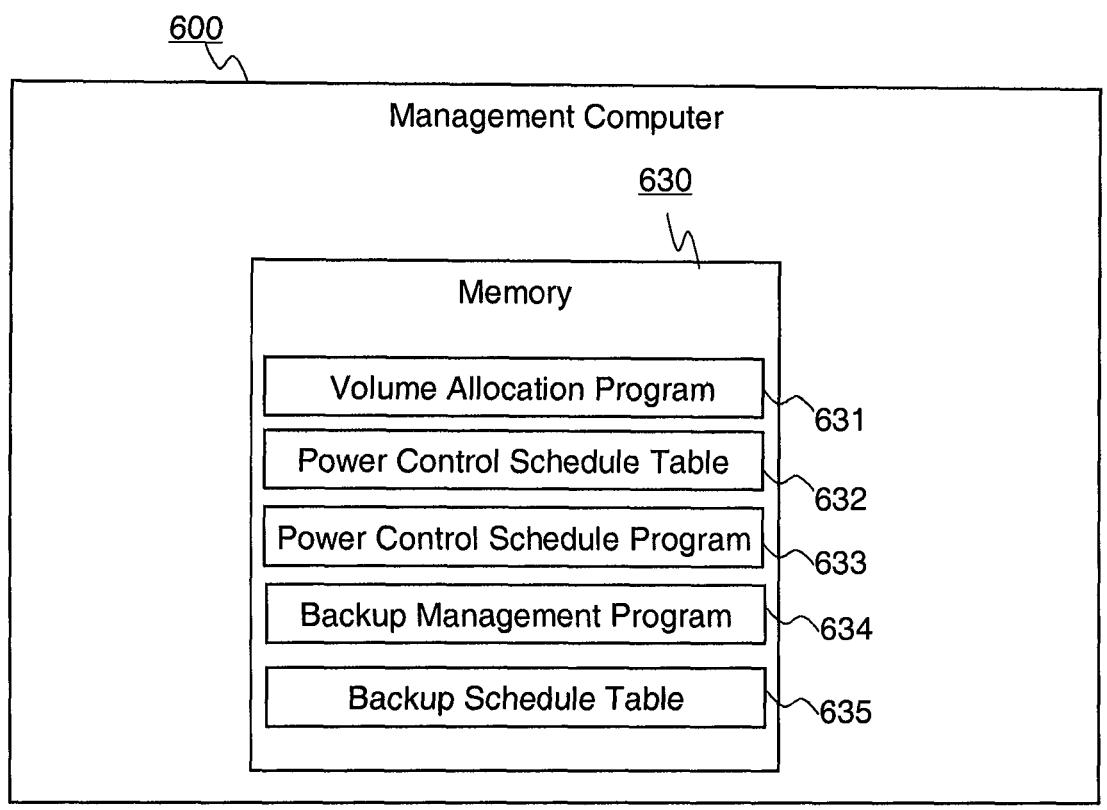
FIG. 2 illustrates an example of a memory in the management computer of FIG. 1.

FIG. 2 illustrates an example of a memory 630 in the management computer 600 of FIG. 1. The memory 630 includes a Volume Allocation Program 631, a Power Control Schedule Table 632, a Power Control Schedule Program 633, a Backup Management Program 634, and a Backup Schedule Table 635.

The Volume Allocation Program 631 determines which storage is appropriate to create volumes requested by users, and then issues a volume creation command to the specified storage. When a user makes a request to add the new volume and designate the backup copy type ("always copied" or "always suspended"), this program refers to the Power Control Schedule Table 632 and finds the proper storage to create the volume. For example, the user designates "always suspended" for the backup sets and inputs the backup schedule, and the Volume Allocation Program 631 detects a storage that is scheduled to be turned on during the input backup execution time by checking the power control schedule according to the Power Control Schedule Table 632.

The Power Control Schedule Table 632 contains the information of power control schedule for each storage system in the computer system of FIG. 1. For example, it has a storage system ID to identify each storage system, the enabled/disabled status of the power control function, and the time when the storage system is turned on/off. The detailed contents are shown in FIG. 3 and described below. The Power Control Schedule Program 633 issues commands to turn on or off the power supply of the storage systems in accordance with the Power Control Schedule Table 632.

The Backup Management Program 634 issues commands for acquiring backup to the storage systems in accordance with the Backup Schedule Table 635. This table manages a schedule of backup acquisition executed by the Backup Management Program 634. The detailed contents are shown in FIG. 4 and described below.

FIG. 3 illustrates an example of the Power Control Schedule Table 632 in the memory 630 of the management computer 600 of FIG. 2. It can be separated into 2 tables as seen in FIG. 3. The first table shown in FIG. 3(a) includes columns of storage system ID 6320 and the status of power control function 6321. The second table shown in FIG. 3(b) contains the power control schedule information for each power-controlled storage system and includes columns of storage system ID 6320, power control frequency 6322, power-on time 6323, and power-off time 6324. Of course, these two tables may be merged in to one table.

FIG. 4 illustrates an example of the Backup Schedule Table 635 in the memory 630 of the management computer 600 of FIG. 2. It contains columns of Pair ID 6350, backup frequency 6351, backup start time 6352, and backup due time 6353. The contents of this table can be updated by the Backup Management Program 634. For example, when a user inputs a backup setting through a backup setting screen, the Backup Management Program 634 can add new backup setting information into this table based on the user's input.

Figure 5:
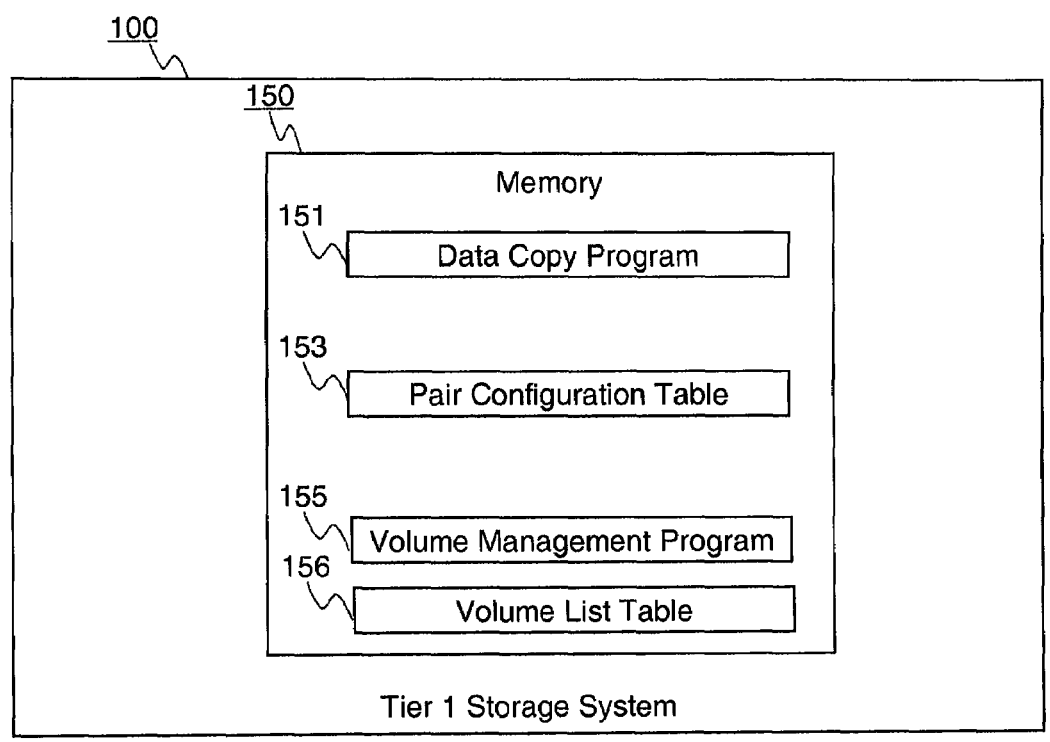
FIG. 5 illustrates an example of a memory in the Tier 1 storage system of FIG. 1.

FIG. 5 illustrates an example of the programs and tables stored in a memory 150 in the Tier 1 storage system 100 of FIG. 1. They include a Data Copy Program 151, a Pair Configuration Table 153, a Volume Management Program 155, and a Volume List Table 156.

The Data Copy Program 151 copies the data from the primary volumes to the secondary volumes as backup. The volume association is defined in the Pair Configuration Table 155. The detailed copy operation is described below. The Pair Configuration Table 153 contains information regarding the definition of the copy pair referred to by Data Copy Program 151. A detailed example is described later. The Volume Management Program 155 creates or deletes volumes in the Tier 1 storage system 100 and updates the Volume List Table 156. It also manages the copy pair configuration by updating the Pair Configuration Table 153. The Volume List Table 156 contains information of volumes within the Tier 1 storage system 100 to manage the volume configurations. The details are shown in FIG. 9 and described below.

Figure 6:
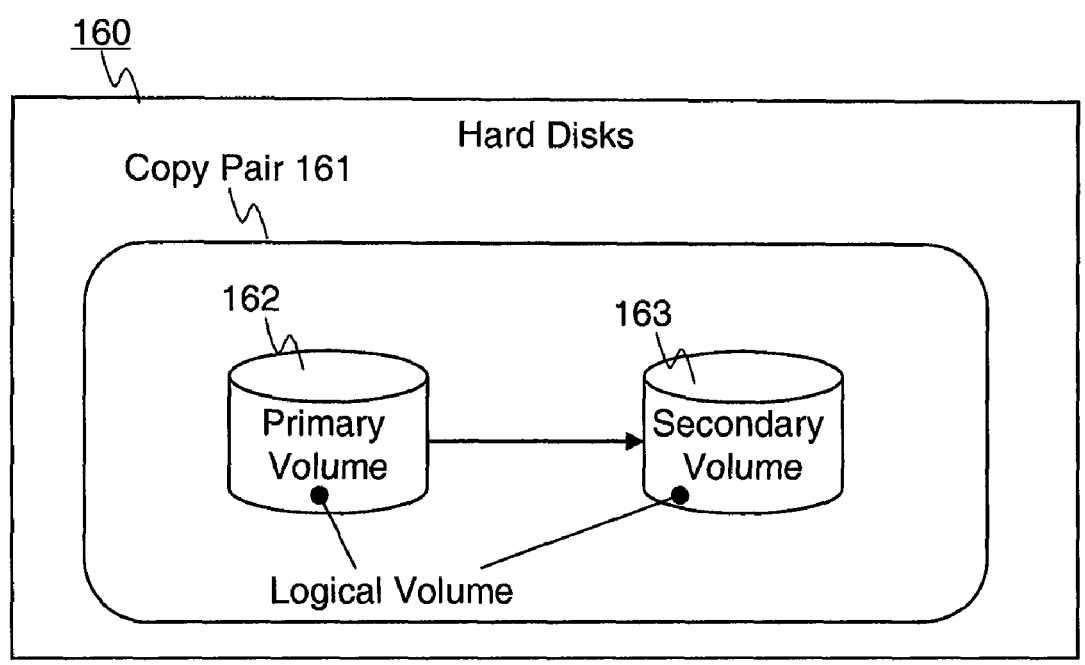
FIG. 6 illustrates an example of a copy pair in the hard disks of FIG. 1.

FIG. 6 illustrates an example of a copy pair in the hard disks 160 of FIG. 1 for data copy. The hard disks 160 are configured to provide logically separate logical volumes comprised of a plurality of disks (RAID configuration). From the aspect of backup or Data Copy Program 151, there are two types of logical volumes: the primary volume 162 and the secondary volume 163. The primary volume 162 is for storing original data to be protected by backup technology, and the secondary volume 163 is for storing backup data copied by the Data Copy Program 151. A set of these two types of volumes is called a copy pair 161.

In the initial copy, the Data Copy Program 151 copies the entire data in the primary volume 162 to the secondary volume 163, while only updated data are copied after the initial copy. The copy process can be temporarily suspended because the pair association is kept unless the pair configuration is deleted. If data are written in the primary volume 162 during the suspension, the Data Copy Program 151 records the updated data address within the hard disk or logical volume. When resuming the copy process after suspension (often called resynchronization), the Data Copy Program 151 copies only updated data to the secondary volume. The detailed status changes are shown in FIG. 7 and described below.

Figure 7:
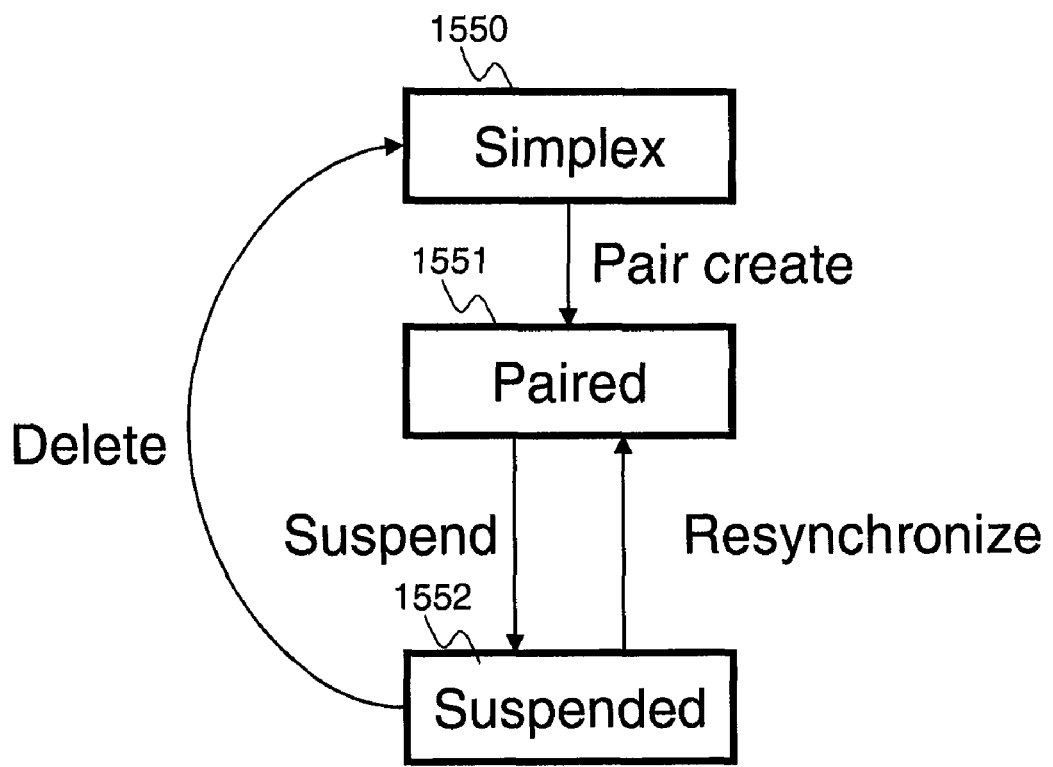
FIG. 7 illustrates an example of a pair status transition in the Data Copy Program in the memory of the Tier 1 storage system of FIG. 5.

FIG. 7 illustrates an example of a pair status transition in the Data Copy Program 151 in the memory 150 of the Tier 1 storage system 100 of FIG. 5. Initially, the pair volumes (primary and secondary volumes) are in the "simplex" status 1550, which means no pair association is established. Once a pair creation is executed, all data in the primary volume 162 are copied to the secondary volume 163 and their statuses are turned into "paired" 1551, which means the primary and the secondary data are synchronized and updated data to the primary volume 162 are copied to the secondary volume 163 as needed. When the pair volumes are suspended by the Data Copy Program 151, the copy process is stopped and the statuses are turned to "suspended" 1552. During the suspended status, updated data to the primary volume 162 is not copied but the data address is recorded. When the pair is requested to resynchronize, the Data Copy Program 151 copies updated data at the recorded address in the primary volume 162 to the secondary volume 163, and the status turns to "paired" 1551 again. To clear the pair definition, it can be deleted by the Data Copy Program 151, tuning the status back to "simplex."

When operating the power-saving storage system, the electric power for the secondary volume 163 can be turned off when it is in the Simplex or Suspended status, while it should be turned on when it is (or is changing to) the Paired status.

FIG. 8 illustrates an example of the Pair Configuration Table 153 in the memory 150 of the Tier 1 storage system 100 of FIG. 5. The Pair Configuration Table 153 includes columns of the Pair ID 1530 which is an identifier of each copy pair and is assigned by the Data Copy Program 151, the Storage System ID for primary volume 1531 which is an identifier for the storage system that owns the primary volume in its disks, the Primary Volume ID 1532 which is an identifier for the primary volume 162 and can be the LUN (logical unit number) of the system that composes the RAID, the Capacity of the primary volume 1533 which is capacity information of the primary volume 162, the Storage System ID of secondary volume 1534 which is an identifier for the storage system that owns the secondary volume in its disks, the Secondary Volume ID 1535 which is an identifier for the secondary volume 163 and can be the LUN (logical unit number) of the system that composes the RAID, and the Capacity of the secondary volume 1536 which is the capacity information of the secondary volume 163.

FIG. 9 illustrates an example of the Volume List Table 156 in the memory 150 of the Tier 1 storage system 100 of FIG. 5. The Volume List Table 156 includes columns of the Volume ID 1560 which is an identifier of the volumes in the Tier 1 storage system 100 and can be the LUN, the Disk Controller ID 1561 which is an identifier of the disk controller 140 in the Tier 1 storage system 100, the Parity Group ID 1562 which is an identifier of the parity groups in the Tier 1 storage system 100, and the Capacity 1563 which indicates a capacity of the corresponding volume.

Figure 10:
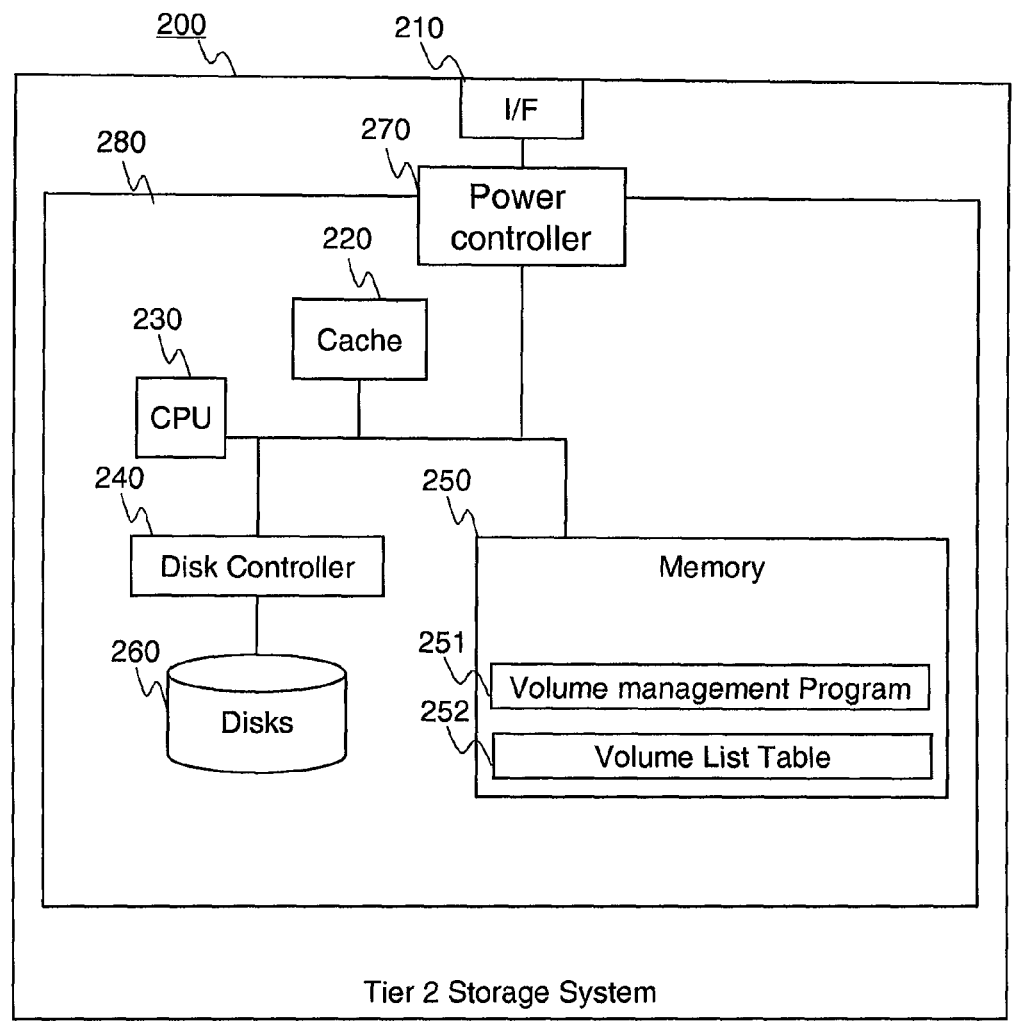
FIG. 10 illustrates an example of a Tier 2 storage system according to the first embodiment of the invention.

FIG. 10 illustrates an example of the Tier 2 storage system 200 (or 300) according to the first embodiment of the invention. The Tier 2 storage system 200 includes an interface 210, a cache 220, a CPU 230, a disk controller 240, a memory 250, hard disks 260, and a power controller 270. The interface 210 provides an interface for the Ethernet network interface and an FC network interface. The cache 220 is used as temporary data storage, and may be a generic semiconductor device or a plurality of such devices. The CPU 230 calls the programs and tables stored in the memory 250, and executes the programs. In this embodiment, execution of programs is always done by the CPU. The disk controller 240 controls associated hard disks 260. The memory 250 stores programs and tables read and used by the CPU 230. In this embodiment, the memory 250 stores the Volume Management Program 251 and Volume List Table 252. These can be the same as those of the Tier 1 storage system 100 (155, 156 in FIG. 5).

The hard disks 260 are one or a plurality of hard disks. A plurality of hard disks can make the RAID configuration for its redundancy. The group of hard disks for a single RAID configuration is called a "parity group" and an identification number is assigned to each parity group. These groups of hard disks are used as logically separate volumes such as the secondary volumes of a copy pair. In the Tier 2 storage system 200 or 300, the hard disks 260 may include SATA disks, for example, that have lower performance than FC disks for accessing the stored data but can be provided at a low cost.

The power controller 270 controls electric power supply to the extent surrounded by a rectangular 280 in FIG. 10. A power control command indicating turning on or off the power is sent form the management computer 600 via the management network 800 and the power controller 270 switches on or off the electric power supply in accordance with the command. When the power controller 270 switches off the power, it can run a normal shutdown process before stopping the power supply. In alternative embodiments, the power controller 270 may be located outside of the Tier 2 storage system 200, 300 and performs in the same way. Furthermore, the Tier 2 storage system 200, 300 may contain a plurality of power control units 280, and the power is controlled on the unit basis (see, e.g., FIG. 19).

Figure 11:
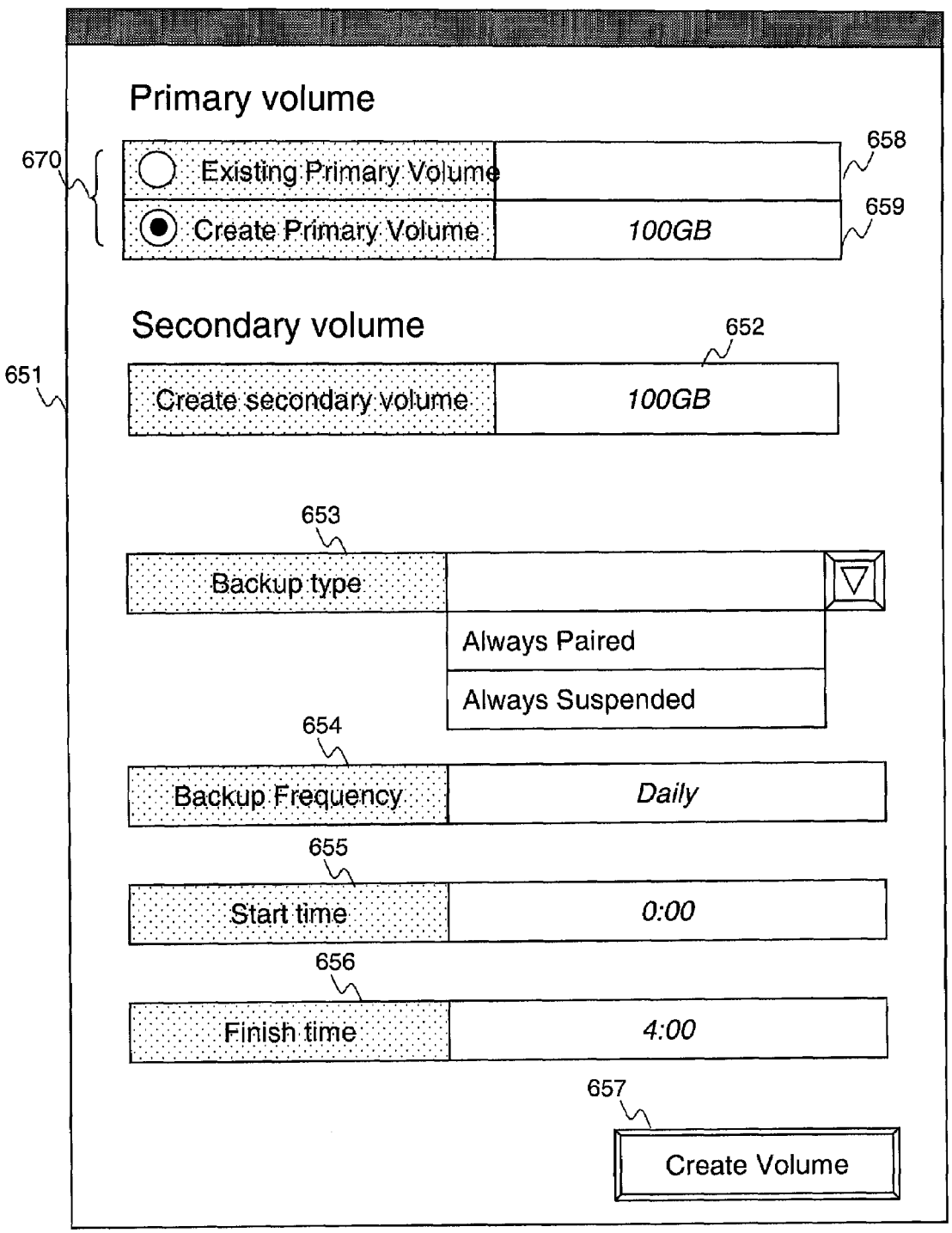
FIG. 11 illustrates an example of a backup setting screen shown at the output device of the management computer of FIG. 1.

FIG. 11 illustrates an example of a backup setting screen 651 shown at the output device 650 of the management computer 600 of FIG. 1. The backup setting screen 651 provides an interface for users to input backup volume setting. The setup window 651 contains at least the following items. Under the primary volume setting 670, users will choose either "Existing Primary Volume" or "Create Primary Volume." If a user wants to choose the existing volume as the primary volume, the user can enter the existing primary volume ID into the input field 658. To create a primary volume, the input field 659 is provided for the capacity of the volume to be specified as the primary volume. For the secondary volume, the Capacity input field 652 is provided for inputting the desired volume capacity. Typically, the capacity of the secondary volume corresponds to the capacity of the primary volume. The Backup Type input field 653 has two options: "Always Copied" or "Always Suspended," which designates the copy type for the targeted pair. The Backup Frequency field 654 is shown only when "Always Suspended" is chosen as the backup type. The Backup Start Time input field 655 is used to input the backup start time. The Backup Finish Time input field 656 is used to input the backup finish time. The Volume Create button 657 can be held down to transmit the above input information to the Volume Allocation Program 631 in the Management Computer 600.

2. Process Flows

FIG. 12(a) illustrates an example of a process flow of operation to turn on the power supply of the Tier 2 storage system 200, 300. The Power Control Schedule Program 633 in the Management Computer 600 refers to the Power Control Schedule Table 632 and issues a power-on request at the time stated in the table, to the corresponding storage system (step 1000). The request message contains at least the destination storage system ID and power-on command. The power controller in the destination storage system (in this case the Tier 2 storage system) receives the request via the management network 800 and executes the power-on operation to supply electric power to its CPU, memory, disk controller, and disks so that the volumes in the system become readable or writable (step 1100).

FIG. 12(b) illustrates an example of a process flow of operation to turn off the power supply of the Tier 2 storage system 200, 300. At the time defined as power-off time in the Power Control Schedule Table 632, the Power Control Schedule Program 633 issues a power-off request to the destination storage (step 1200). The request message contains at least the destination storage system ID and power-off command. The power controller in destination storage system (in this case the Tier 2 storage system) receives the request via the management network 800 and executes power-off operation to stop supplying electric power to its CPU, memory, disk controller, and disks (step 1300). This step can be accompanied with a normal shutdown process of storage system such as writing cached data to the disks.

FIG. 13 illustrates an example of an overall process flow of the backup environment setup process. It describes the case in which the primary volume is created in the Tier 1 storage system 100, and the secondary volume is created in the Tier 2 storage system 200, 300 as a result of the calculation of the Volume Allocation Program 631. At first, the management computer 600 receives a volume creation request from a user input through a management screen (step 2000). The input information is transmitted to the Volume Allocation Program 631, and it calculates and determines the destination storage system to create a volume using an after-mentioned scheme of FIG. 14 (step 2100). Then the management computer 600 issues a volume creation request to the target storage system (step 2200). Receiving the request via the management network 800, the Tier 1 and Tier 2 storage systems 100, 200, 300 each create a volume according to the information in the request message (step 2300) and returns completion of the process with the created volume ID. After that, the management computer 600 issues a pair registration command to the Tier 1 storage system 100 (step 2400). The Tier 1 storage system registers a pair (step 2500).

If the Volume Allocation Program 631 determines that the primary volume and the secondary volume are to be allocated in the Tier 1 storage system in step 2200, the volume creation request is simply sent to only the Tier 1 storage system, and the Volume Management Program in the Tier 1 storage system creates the primary and the secondary volumes.

It is also possible that the user issues a request to create volume only for the secondary volume 200, 300 that is paired to an existing primary volume 100, and the Volume Allocation Program 631 issues a volume creation request to either the Tier 1 storage system or the Tier 2 storage system.

FIG. 14 illustrates an example of a process flow of the Volume Allocation Program 631 in the memory 630 of the management computer 600 of FIG. 2. First, it receives a volume creation request from a user input through the input screen shown in FIG. 11 and described above (step 3000). If the existing volume is selected as the primary volume (step 3700 yes), it proceeds to step 3100. If primary volume is to be created (step 3700 no), the Volume Allocation Program 631 finds the permanently on storage system (step 3800), and then issues a volume creation command to the found storage system (step 3900). If the backup requirement is "Always Paired" or "Always Copied" (step 3100), the program finds a storage system that is permanently turned on using the Power Control Schedule Table 632, and designates the storage as a secondary volume location (step 3200). Then the program issues a volume creation request for the primary volume and the secondary volume to the target storage system (step 3300). The location of the primary volume will be a Tier 1 storage system in this embodiment. If the backup requirement is "Always Suspended" (step 3100), the program also refers to the backup schedule input by the user (step 3400), and finds a Tier 2 storage system that will be turned on during the backup window (step 3500). Then, the program issues a volume creation request for both primary and the secondary volumes (step 3600).

In step 3500, if no Tier 2 storage system matches the backup schedule, the following two options can be applied. The first option is to locate the secondary volume on the permanently turned on storage. The second option is to change the power on/off schedule for one of the Tier 2 storage systems by updating the Power Control Schedule Table 632. In this case, the earlier of the backup start time and existing power on time will be the new power on time for the Tier 2 storage system. On the other hand, the later of the backup due time and existing power off time will be the new power off time for the Tier 2 storage system.

When either the power control schedule or the backup schedule is changed in operation, the Volume Allocation Program 631 can be called and it can recalculate the appropriate location of volumes that are related to the change.

FIG. 15 illustrates an example of the volume creation process executed by the Volume Management Program 155 in the memory 150 of the Tier 1 storage system 100 of FIG. 5. At first, the Tier 1 storage system 100 receives a volume creation command from the management computer 600 and the command is transferred to the Volume Management Program 155 (step 4000). This command contains information of the destination storage ID and volume capacity. The Volume Management Program 155 searches the availability of needed capacity in the storage (step 4100). If it has the available disks or parity groups that satisfy the capacity demand (step 4200 yes), it creates a volume and updates the volume list table 156 (step 4300). If it does not have the available disks or parity groups that satisfy the capacity demand (step 4200 no), it returns an error message (step 4400). The error message can include a suggestion for users to add a particular amount of capacity or a particular number of disks.

FIG. 16 illustrates an example of a process flow of pair registration executed by the Volume Management Program 155 in the memory 150 of the Tier 1 storage system 100 of FIG. 5. At first, the Tier 1 storage system 100 receives a pair registration request from the management computer 600 and the request is transferred to the Volume Management Program 155 (step 5000). This command contains information of the destination storage ID and volume ID for both primary and secondary volumes of a copy pair. The program registers the pair configuration by updating the Pair Configuration Table 153 as specified in the received request (step 5100). The program then returns a completion message to the management computer 600 (step 5200).

FIG. 17 illustrates an example of a process flow of the overall power control and backup operation of the power-saving storage system. In this case, the power-saving storage system is a Tier 2 storage system 200, 300. In the operation, the Tier 2 storage system 200 or 300 is turned on in accordance with the schedule (step 7000), and then the backup process is executed as explained below in connection with FIG. 18 (step 7100). After the backup process is completed, the Tier 2 storage system is turned off (step 7200). Steps 7000 to 7200 are repeated according to the operation schedule.

FIG. 18 illustrates an example of a process flow of the backup operation. First, the Backup Management Program 634 in the management computer 600 issues a backup request to the Tier 1 storage system 100 at a time defined by the Backup Schedule Table 635 (step 8000). This request or command includes at least a Pair ID. Upon receiving the request, the Data Copy Program 151 of the Tier 1 storage system 100 resynchronizes the copy pair (step 8100). This step may include a process to wait for completion of the resynchronization. After completion of the resynchronization, the Data Copy Program 151 suspends the pair again (step 8200) and returns the message that informs the management computer 600 of the completion of the backup process (step 8300).

Second Embodiment

In the second embodiment, the power-saving unit is different from that in the first embodiment. In the second embodiment, a method to provision the primary volume and the secondary volume for a backup set is provided. It is assumed that the computer system has Tier 1 storage and Tier 2 storage systems and that a certain unit of the hard disks in the Tier 2 storage system is periodically turned on/off for the purpose of power-saving effect.

Figure 19:
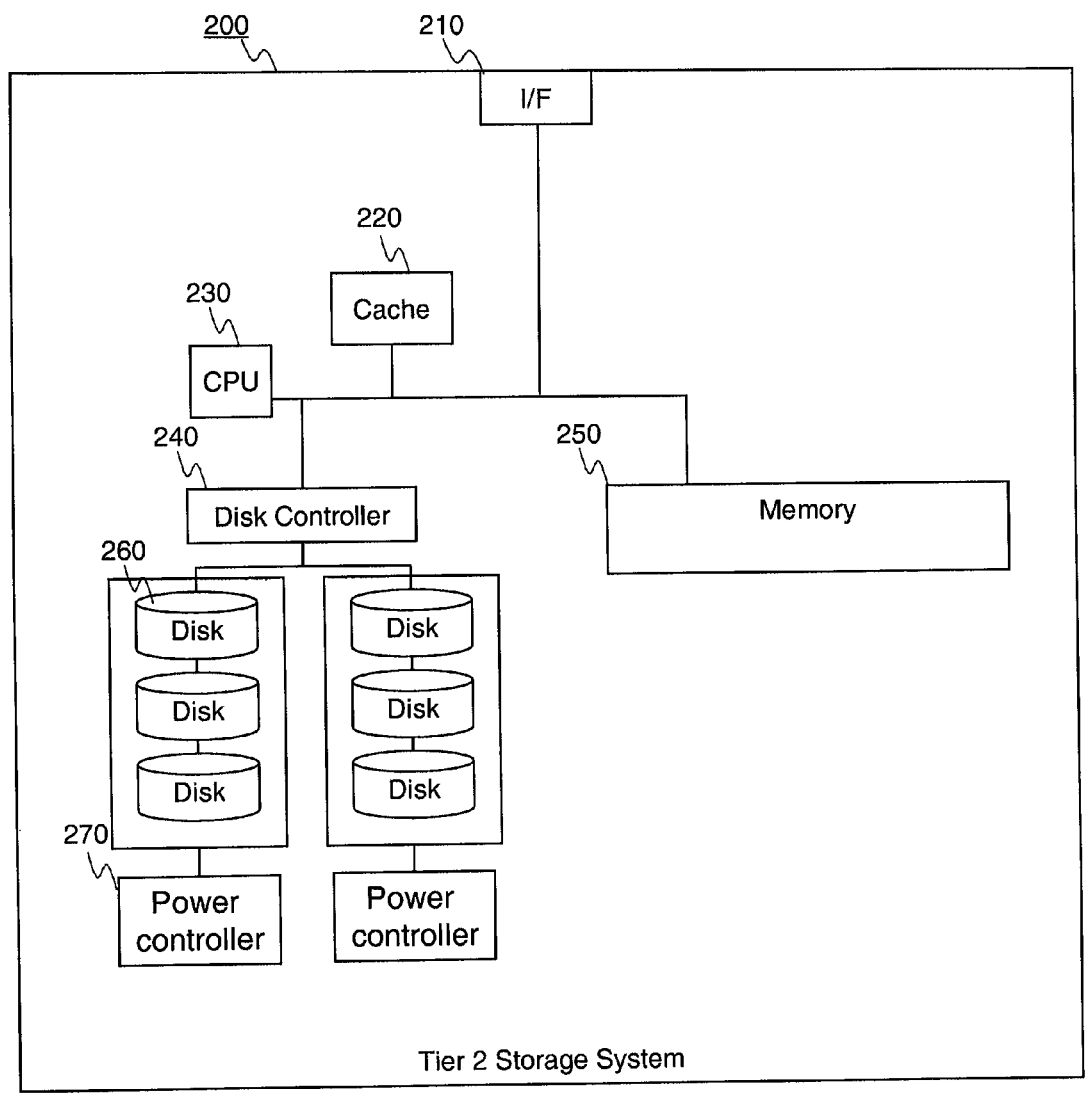
FIG. 19 illustrates an example of a Tier 2 storage system according to a second embodiment of the invention.

FIG. 19 illustrates an example of a Tier 2 storage system 200 according to the second embodiment. The difference between the first embodiment (FIG. 10) and the second embodiment (FIG. 19) is the power-control unit. The other components of the system will be the same as those of the first embodiment. In the second embodiment, it becomes possible to control the electric power supply with a unit of group of hard disks such as a parity group, by spinning up or down them. Each group has a corresponding power controller 270. In this case, the power controller 270 receives a request to spin up/down with the specific Disk Controller ID 1561 and Parity Group ID 1562 from the management server 600 and executes spinning up/down as the power control. This power control system can also be applied to the Tier 1 storage system 100.

FIG. 20 illustrates an example of a Power Control Schedule Table 632 in the memory 630 of the management computer 600 of FIG. 2. The difference between the first embodiment (FIG. 3) and the second embodiment (FIG. 20) is that the second embodiment further includes the Disk Controller ID column 6391 and the Parity Group ID column 6392, in addition to the storage subsystem ID 6390, the power control frequency 6393, the power-on time 6394, and the power-off time 6395.

FIG. 21 illustrates an example of a process flow of the Volume Allocation Program 631 in the memory 630 of the management computer 600 of FIG. 2 according to the second embodiment. First, the program receives a volume creation request from a user input through the input screen shown in FIG. 11 and described above (step 3001). If the existing volume is selected as the primary volume (step 3701 yes), it proceeds to step 3101. If the primary volume is to be created, the Volume Allocation Program 631 finds a permanently on storage system or a parity group (step 3801), and then issues a volume creation command to the specified storage system (step 3901). If the backup requirement is "Always Paired" (step 3101), the program finds a parity group that is permanently turned on by referring to the Power Control Schedule Table 632, and designates the parity group as a secondary volume location (step 3201). Then the program issues a volume creation request for the primary volume and the secondary volume to the target storage systems (step 3301). The location of the primary volume will be in the permanently turned-on parity group in this embodiment. If the backup requirement is "Always Suspended" (step 3101), the program also refers to the backup schedule input by the user (step 3401), and finds a Tier 2 storage system and the parity group that will be turned on during the backup window (step 3501). Then, the program issues a volume creation request for both primary and secondary volumes (step 3600). The second embodiment (FIG. 21) differs from the first embodiment (FIG. 14) in that the parity group is involved in steps 3201, 3301, and 3501.

From the foregoing, it will be apparent that the invention provides methods, apparatuses and programs stored on computer readable media for provisioning appropriate configuration of data volumes in power-saving information systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A power-saving computer system comprising:
   a plurality of storage areas provided by one or more storage systems, including at least one first storage area which is always powered on and at least one second storage area which is periodically powered on and off according to a power control schedule;
   wherein the at least one first storage area provides primary and secondary volumes of a first backup set that is scheduled as always paired;
   wherein for a second backup set that is scheduled as normally suspended and resynchronized according to a backup schedule, a primary volume of the second backup set is included in the at least one first storage area and a secondary volume of the second backup set is included in the at least one second storage area;
   wherein the at least one second storage area having the secondary volume of the second backup set is powered on according to the power control schedule during every backup time for resynchronizing the second backup set according to the backup schedule; and
   wherein for a third backup set that is scheduled as normally suspended and resynchronized according to the backup schedule, a primary volume of the third backup set is included in the at least one first storage area and a secondary volume of the third backup set is also included in the at least one first storage area, if a backup time of the secondary volume of the third backup set does not match a time when the at least one second storage area is powered on according to the power control schedule.

2. A power-saving computer system according to claim 1, wherein the at least one second storage area each includes one or more storage disks, the system further comprising:
   a power controller that switches power on or off for the one or more storage disks of each of the at least one second storage area according to the power control schedule.

3. A power-saving computer system according to claim 1, wherein the at least one first storage area is provided in a first storage system and is always powered on; and
   wherein the at least one second storage area is provided in a second storage system and is periodically powered on or off according to the power control schedule.

4. A power-saving computer system according to claim 3, wherein the second storage system includes a power controller that switches power on or off for the at least one second storage area provided therein according to the power control schedule.

5. A power-saving computer system according to claim 3, wherein the second storage system includes a plurality of power controllers each corresponding to one of a plurality of the second storage areas each having at least one storage disk, and each power controller switches power on or off for the corresponding second storage area according to the power control schedule.

6. A power-saving computer system according to claim 1, further comprising:
   a power controller which switches power on or off for the at least one second storage area according to the power control schedule.

7. A power-saving computer system according to claim 1, further comprising:
   a management computer which maintains the backup schedule and the power control schedule, and manages powering on or off of the at least one second storage area.

8. A power-saving computer system according to claim 7, wherein the management computer allocates the secondary volume of the second backup set according to the backup schedule and the power control schedule.

9. A power-saving computer system according to claim 7, wherein the management computer changes the power control schedule based on the backup schedule, if necessary, so that the at least one second storage area having the secondary volume of the second backup set is powered on during every backup time for resynchronizing the second backup set according to the backup schedule.

10. In a computer system which includes a plurality of storage areas provided by one or more storage systems, including at least one first storage area which is always powered on and at least one second storage area which is periodically powered on and off according to a power control schedule, a method to provide data storage for power-saving, comprising:
    allocating to the at least one first storage area primary and secondary volumes of a first backup set that is scheduled as always paired; and
    for a second backup set that is scheduled as normally suspended and resynchronized according to a backup schedule, allocating a primary volume of the second backup set to the at least one first storage area and allocating a secondary volume of the second backup set to the at least one second storage area;
    wherein the at least one second storage area having the secondary volume of the second backup set is powered on according to the power control schedule during every backup time for resynchronizing the second backup set according to the backup schedule; and
    for a third backup set that is scheduled as normally suspended and resynchronized according to the backup schedule, allocating a primary volume of the third backup set in the at least one first storage area, and allocating a secondary volume of the third backup set also in the at least one first storage area, if a backup time of the secondary volume of the third backup set does not match a time when the at least one second storage area is powered on according to the power control schedule.

11. A method according to claim 10, wherein the at least one second storage area each includes one or more storage disks, the method further comprising:
providing a power controller that switches power on or off for the one or more storage disks of each of the at least one second storage area according to the power control schedule.

12. A method according to claim 10,
wherein the at least one first storage area is provided in a first storage system and is always powered on; and
wherein the at least one second storage area is provided in a second storage system and is periodically powered on or off according to the power control schedule.

13. A method according to claim 12, wherein the second storage system includes a power controller, the method further comprising:
switching power on or off for the at least one second storage area in the second storage system using the power controller according to the power control schedule.

14. A method according to claim 12, wherein the second storage system includes a plurality of power controllers each corresponding to one of a plurality of the second storage areas each having at least one storage disk, the method further comprising:
switching power on or off using each power controller for the corresponding second storage area according to the power control schedule.

15. A method according to claim 10, further comprising:
providing a management computer which maintains the backup schedule and the power control schedule, and manages powering on or off of the at least one second storage area.

16. A method according to claim 10, further comprising:
changing the power control schedule based on the backup schedule, if necessary, so that the at least one second storage area having the secondary volume of the second backup set is powered on during every backup time for resynchronizing the second backup set according to the backup schedule.

17. In a computer system which includes a plurality of storage areas provided by one or more storage systems, including at least one first storage area which is always powered on and at least one second storage area which is periodically powered on and off according to a power control schedule, a computer-readable medium storing a plurality of instructions to provide data storage for power-saving, comprising:
instructions that cause the data processor to allocate to the at least one first storage area primary and secondary volumes of a first backup set that is scheduled as always paired;
instructions that cause the data processor, for a second backup set that is scheduled as normally suspended and resynchronized according to a backup schedule, to allocate a primary volume of the second backup set to the at least one first storage area and to allocate a secondary volume of the second backup set to the at least one second storage area; wherein the at least one second storage area having the secondary volume of the second backup set is powered on according to the power control schedule during every backup time for resynchronizing the second backup set according to the backup schedule; and
instructions that cause the data processor, for a third backup set that is scheduled as normally suspended and resynchronized according to the backup schedule, to allocate a primary volume of the third backup set in the at least one first storage area, and allocating a secondary volume of the third backup set also in the at least one first storage area, if a backup time of the secondary volume of the third backup set does not match a time when the at least one second storage area is powered on according to the power control schedule.

18. A computer-readable medium according to claim 17, further comprising:
instructions that cause the data processor to change the power control schedule based on the backup schedule, if necessary, so that the at least one second storage area having the secondary volume of the second backup set is powered on during every backup time for resynchronizing the second backup set according to the backup schedule.

* * * * *